US012486968B2

(12) United States Patent
Conner et al.

(10) Patent No.: US 12,486,968 B2
(45) Date of Patent: Dec. 2, 2025

(54) LUMINAIRE WITH REPLACEABLE LED BOARD

(71) Applicant: HALCO LIGHTING TECHNOLOGIES, LLC, Norcross, GA (US)

(72) Inventors: Ethan C. Conner, Norcross, GA (US); Christopher Chickanosky, Brookhaven, GA (US)

(73) Assignee: HALCO LIGHTING TECHNOLOGIES, LLC, Norcross, GA (US)

( * ) Notice: Subject to any disclaimer, the term of this patent is extended or adjusted under 35 U.S.C. 154(b) by 0 days.

(21) Appl. No.: 18/816,360

(22) Filed: Aug. 27, 2024

(65) Prior Publication Data

US 2025/0075887 A1 Mar. 6, 2025

Related U.S. Application Data

(60) Provisional application No. 63/579,700, filed on Aug. 30, 2023.

(51) Int. Cl.
*F21V 19/00* (2006.01)
*F21V 19/04* (2006.01)
*F21Y 115/10* (2016.01)

(52) U.S. Cl.
CPC ............ *F21V 19/003* (2013.01); *F21V 19/04* (2013.01); *F21Y 2115/10* (2016.08)

(58) Field of Classification Search
CPC ............................... F21V 19/003; F21V 19/04
USPC ..................................................... 362/249.02
See application file for complete search history.

(56) References Cited

U.S. PATENT DOCUMENTS

| | | | | |
|---|---|---|---|---|
| 5,896,093 | A * | 4/1999 | Sjobom | G09F 9/33 340/815.45 |
| 7,796,208 | B2 * | 9/2010 | Ho | G02F 1/133608 349/61 |
| 7,810,968 | B1 * | 10/2010 | Walker | F21V 21/30 362/249.02 |
| 8,197,091 | B1 * | 6/2012 | Kyle | F21S 8/088 362/249.06 |
| 8,449,169 | B2 | 5/2013 | Maslowski et al. | |
| 8,596,837 | B1 | 12/2013 | Wronski | |
| 8,827,494 | B2 | 9/2014 | Bergeron | |
| 9,103,536 | B2 | 8/2015 | Sachsenweger et al. | |
| 9,146,027 | B2 | 9/2015 | Zantout et al. | |
| 9,249,955 | B2 | 2/2016 | Schroll et al. | |
| 9,423,119 | B2 | 8/2016 | Schroll et al. | |

(Continued)

FOREIGN PATENT DOCUMENTS

| | | | |
|---|---|---|---|
| DE | 102010039120 | A1 | 2/2012 |
| DE | 202013004934 | U1 | 10/2014 |

(Continued)

*Primary Examiner* — Bryon T Gyllstrom
(74) *Attorney, Agent, or Firm* — Perilla Knox & Hildebrandt LLP

(57) ABSTRACT

A removable LED board and a luminaire incorporating a replaceable LED board are disclosed. The removable LED board comprises one or more LED light sources, one or more alignment and attachment elements configured for cooperative engagement with corresponding elements of the luminaire base or housing, and an electric connector. Methods of replacement of an LED board within a luminaire are also disclosed.

16 Claims, 15 Drawing Sheets

(56) References Cited

U.S. PATENT DOCUMENTS

| | | | | |
|---|---|---|---|---|
| 9,429,309 | B2 | 8/2016 | Schroll et al. | |
| 9,772,655 | B1 * | 9/2017 | Brooks | F21K 9/60 |
| 10,215,373 | B2 * | 2/2019 | Kim | F21V 17/02 |
| 10,317,066 | B2 | 6/2019 | Mathews et al. | |
| 10,683,978 | B2 | 6/2020 | Chen | |
| 10,781,980 | B2 * | 9/2020 | Brooks | H01L 25/0753 |
| 11,193,663 | B2 | 12/2021 | Wu | |
| 2007/0230184 | A1 * | 10/2007 | Shuy | F21V 29/83 362/294 |
| 2008/0002399 | A1 * | 1/2008 | Villard | F21V 17/107 362/184 |
| 2010/0195326 | A1 * | 8/2010 | Boxler | F21K 9/68 362/249.02 |
| 2011/0211351 | A1 * | 9/2011 | Van De Ven | F21V 29/74 362/249.02 |
| 2012/0257374 | A1 * | 10/2012 | Daniel | F21K 9/232 362/249.02 |
| 2013/0265752 | A1 * | 10/2013 | Shimizu | F21V 29/773 362/330 |
| 2014/0301089 | A1 | 10/2014 | Stucchi | |
| 2018/0128457 | A1 | 5/2018 | Liang et al. | |
| 2020/0232613 | A1 * | 7/2020 | Lauck | A01G 9/249 |

FOREIGN PATENT DOCUMENTS

| | | | |
|---|---|---|---|
| DE | 102020103187 | A1 | 8/2021 |
| EP | 2413015 | B1 | 1/2015 |
| EP | 2799766 | B1 | 10/2016 |
| EP | 2902697 | B1 | 7/2018 |
| JP | 4528277 | B2 | 8/2010 |
| KR | 101116579 | B1 | 2/2012 |
| KR | 1020120029780 | A | 3/2012 |
| KR | 200462181 | Y1 | 8/2012 |
| KR | 101185207 | B1 | 9/2012 |
| KR | 200472694 | Y1 | 5/2014 |
| KR | 101722322 | B1 | 4/2017 |
| KR | 200487013 | Y1 | 7/2018 |
| KR | 1020180093328 | A | 8/2018 |
| WO | 2014064282 | A1 | 5/2014 |
| WO | 2023161426 | A1 | 8/2023 |

* cited by examiner

LUMINAIRE WITH REPLACEABLE LED BOARD

CROSS-REFERENCE TO RELATED APPLICATIONS

This application claims priority to U.S. Provisional Patent Application Ser. No. 63/579,700 filed Aug. 30, 2023, the entirety of which is hereby incorporated by reference herein.

TECHNICAL FIELD

The present invention relates generally to the field of luminaires or lighting fixtures, and more particularly to a luminaire or lighting fixture with a replaceable LED (light-emitting diode) board, and to replacement LED boards for luminaires or lighting fixtures, and methods for replacement of LED boards in luminaires or lighting fixtures.

BACKGROUND

Luminaires, also referred to as lighting fixtures, utilizing light-emitting diodes (LEDs) commonly comprise a housing or base, a power driver, a lens or optics, and an LED board. The housing is typically the longest lasting and most expensive component and is very rarely replaced. The power driver is the shortest lasting component and is relatively inexpensive compared to the cost of the fixture. Thus, the power driver is often designed to be replaceable. The lens or optics of a luminaire may also be designed to be replaced, as they often become damaged or yellowed from ultraviolet exposure. The lens or optics may also be replaced to change the beam pattern of a luminaire. Thus, luminaires are often designed to have a replaceable power driver and optics that extend the life of the luminaires beyond the original life span of the power driver and optics.

The LED boards have an intermediate lifespan compared to the other components of the luminaire and are somewhat costly, but they are typically not designed to be replaceable due in large part to thermal considerations. When power is supplied to an LED board, the LED board generates heat which must be dissipated, or the life of the LED board may be shortened. Various methods exist to facilitate heat transfer, but often a thermal paste or other heat-conductive material is applied to the back of an LED board to help dissipate the heat by conduction to the housing as a heat sink from the LED board to ambient surroundings. In such cases, the thermal paste typically must be precisely applied, and the LED board and housing precisely assembled in order to ensure adequate thermally conductive contact for heat dissipation for proper functionality of the board. Because of this, the LED boards of known luminaires are generally designed to be integral or permanently affixed to the fixture and housing, such that they cannot readily be replaced. Also, third-party testing centers, such as Underwriters Laboratories (UL), may consider such heat dissipation issues in their testing and approval process for safety and reliability, and may not approve field-replaceable LED boards due to the risk that a contractor or installer in the field may fail to address such issues properly. Therefore, with previously known luminaires, when an LED board goes bad or gets damaged, the whole fixture typically must be discarded, and a new fixture installed in its place.

Accordingly, it can be seen that needs exist for improvements to luminaires or light fixtures. It is to the provision of such improvements, including the provision of a luminaire with a replaceable LED board meeting these and other needs, that the present invention is primarily directed.

SUMMARY

In example embodiments, the present invention provides for a luminaire with one or more removable and replaceable LED boards. In further example embodiments, the luminaire comprises a housing, a power driver, an optic or lens, and a removable and replaceable LED board. The luminaire optionally further comprises one or more alignment and/or attachment elements, such as pins and receivers, screws, projections and recesses, fasteners, or other features or components. The removable LED board further comprises LEDs, releasable attachment elements, such as keyhole slots, alignment or positioning elements, and a detachable and reconnectable electrical coupling or connector that houses power terminals connected to the LEDs. The LED board is attached to the housing by guiding the alignment and/or attachment element(s) of the housing or other components into alignment and/or engagement with the corresponding alignment or attachment element(s) of the LED board. The electrical connector of the LED board is then connected to the receiver or cooperating coupling element on the housing, which enables power to flow from the power driver to the LED board.

In one aspect, the present invention relates to a replaceable light-emitting diode (LED) board for a luminaire, the replaceable LED board including a panel configured for removable engagement within a housing of the luminaire; a plurality of light emitting-diode light sources on the panel; a releasable electrical coupling for connection with a cooperative coupling of the housing, to deliver electrical power to illuminate the light emitting-diode light sources; and at least one alignment feature for maintaining consistent positioning of the panel within the housing when the LED board is removed from and replaced in the housing.

In another aspect, the invention relates to a luminaire having a replaceable light emitting diode (LED) board. The luminaire preferably includes a housing having at least one passage for allowing light to pass therethrough, a first detachable electrical coupling portion, and at least one housing alignment feature. The luminaire preferably also includes a LED board having a panel configured for removable engagement within the housing, a plurality of light emitting-diode light sources positioned on the panel, a second detachable electrical coupling portion for detachable and re-attachable connection with the first detachable electrical coupling portion of the housing to deliver electrical power to illuminate the light emitting-diode light sources, and at least one LED board alignment feature for cooperative alignment with the at least one housing alignment feature to maintain a consistent positioning of the panel within the housing. The LED board is preferably removable from the housing and replaceable into the housing by alignment of the at least one LED board alignment feature with the at least one housing alignment feature and connection of the first and second detachable electrical coupling portions.

In still another aspect, the invention relates to a method of replacement of a first LED board with a second LED board within a luminaire. The method preferably includes the steps of disengaging a detachable electrical coupling between the first LED board and a housing of the luminaire; removing the first LED board from a specific position within the housing of the luminaire; installing the second LED board into the housing of the luminaire by aligning at least one LED board alignment feature of the LED board with at least one corresponding housing alignment feature of the housing to align the second LED board in the same specific position within the housing; and engaging the detachable electrical coupling between the second LED board and the housing of the luminaire.

In another aspect, the invention relates to a replaceable LED board for a luminaire, the LED board comprising one or more LEDs, one or more detachable and re-attachable attachment elements configured for cooperative engagement with a second detachable and re-attachable element, and an electrical connector. The connector further comprises power terminals connected to the LEDs.

In another aspect, the invention relates to a luminaire, the luminaire comprising a housing having one or more first detachable and re-attachable attachment elements, a power driver, an optic, and a removable LED board. The removable LED board further comprises one or more LEDs, one or more second detachable and re-attachable attachment elements configured for cooperative engagement with the one or more first detachable and re-attachable attachment elements, and one or more electrical connectors housing power terminals. The removable LED board is configured to be removably connected to the housing and power driver.

In still another aspect, the invention relates to a process for replacing an LED board of a luminaire, the process comprising the steps of disconnecting an electrical connector of a first LED board from a power driver, removing a first LED board from the luminaire, inserting a second LED board into the luminaire, and connecting an electrical connector of the second LED board to the power driver.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
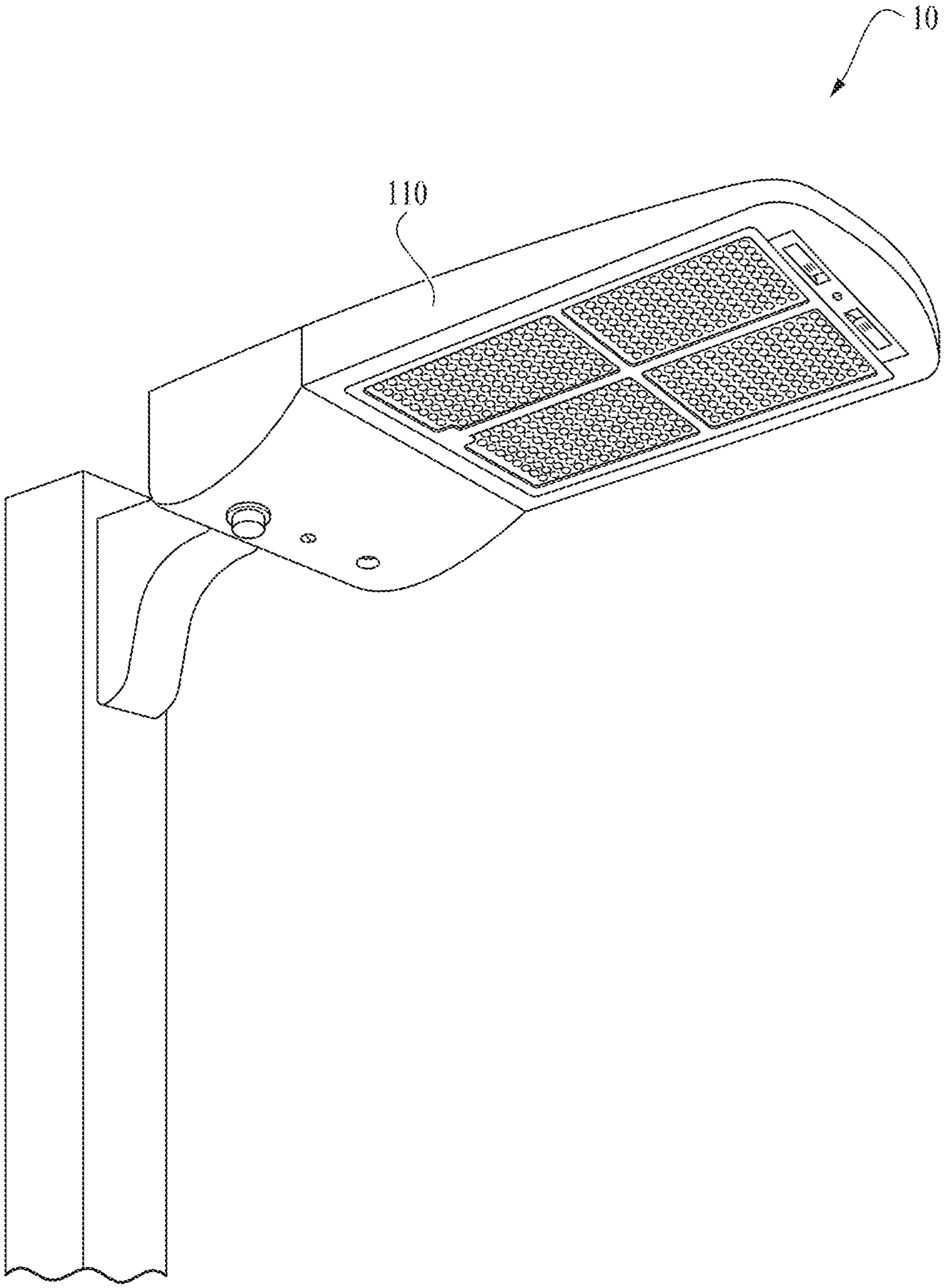
FIG. 1 is a perspective view of a luminaire or light fixture having a replaceable LED lighting board according to an example embodiment of the present invention.

With reference now to the drawing figures, wherein like reference numbers represent corresponding parts throughout the several views, FIG. 1 shows a luminaire or lighting fixture 10 according to an example embodiment of the invention. In the depicted embodiment, the luminaire 10 is a pole-mounted fixture, but in other embodiments may be wall-mounted and/or any of a variety of different fixture types, sizes and formats, and may include various mounting components or supporting hardware for mounting the luminaire 10 to various structures and support elements or may be self-supporting on the ground or other support surface. Additional features and components of the luminaire 10 are further shown and described with reference to FIG. 2 (including FIGS. 2A, 2B, 2C, 2D, 2E and 2F) and FIG. 3 (including FIGS. 3A, 3B, 3C, 3D, 3E and 3F)

In example embodiments, the luminaire 10 generally comprises a housing 110, a lens cover or optics 120, and a removable and replaceable LED board 130, and optionally a power driver and/or electronic controls to power and allow user control of the luminaire. In example embodiments, the housing 110 comprises a substantially rigid outer shell defining an interior space or chamber therein for containment of electronic and lighting components of the luminaire 10. In some example embodiments, the housing 110 is constructed or treated to be substantially waterproof or water-resistant, corrosion-resistant, and/or UV-resistant. In some example embodiments, the housing 110 may be a casting. In other embodiments, the housing may be 3D printed, extruded, stamped, or formed by another process. In some embodiments, the housing 110 may be made from metal, such as aluminum or steel. In other embodiments, the housing may be made from plastic. In yet further embodiments, the housing may be made from another suitable material. Preferably, the housing 110 at least partially comprises material(s) having a sufficiently high thermal conductivity to function as a heat sink to receive heat generated by the LED board and other electronics, conduct the heat away from the electronics, and dissipate the heat to ambient surroundings to prevent overheating and potential resultant heat damage to the luminaire and associated equipment.

Figure 2A:
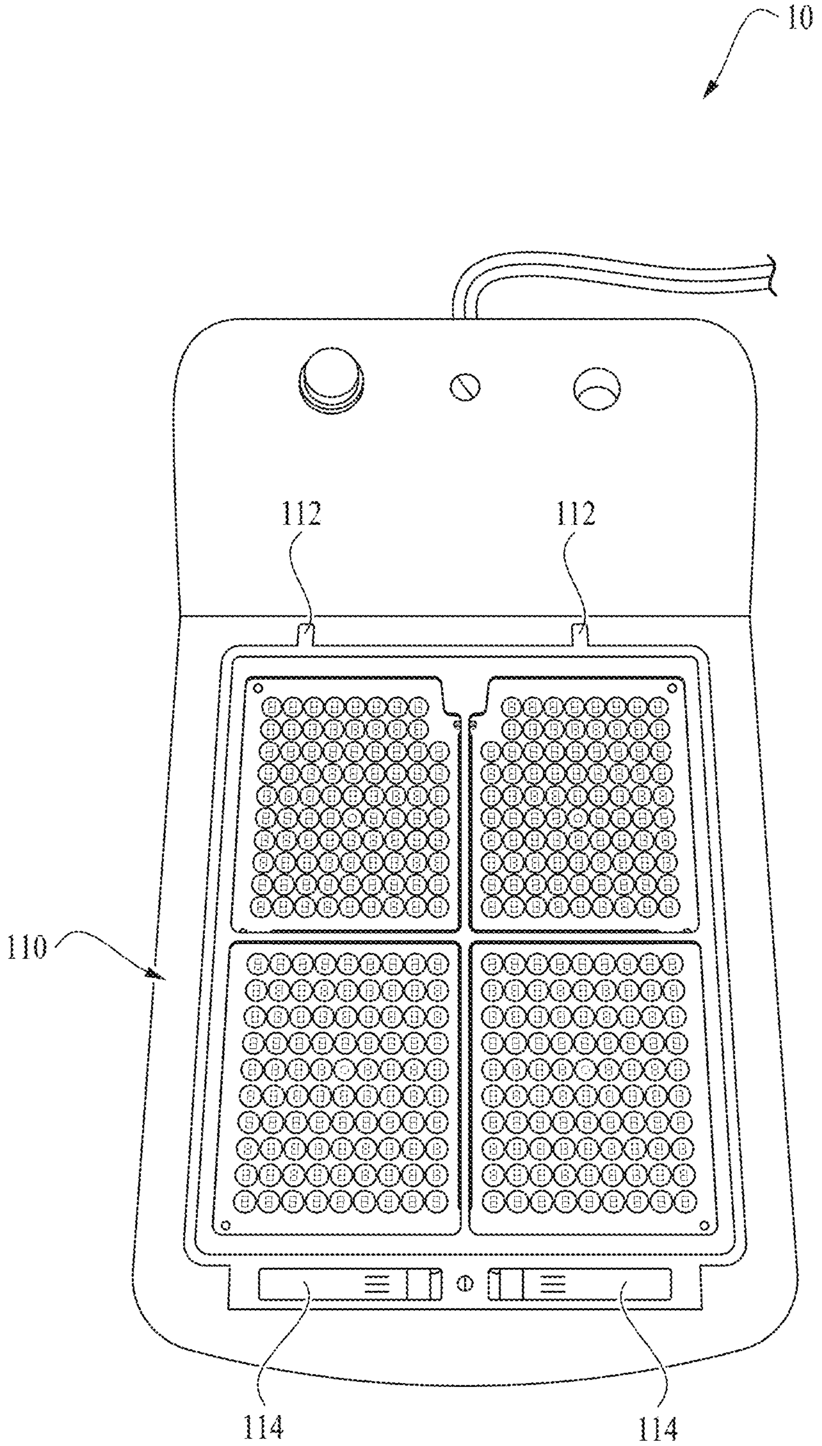
FIGS. 2A-2F (collectively referred to herein as FIG. 2) show a sequence of removal of a replaceable LED board from a luminaire or lighting fixture according to an example embodiment of the present invention.
Figure 2B:
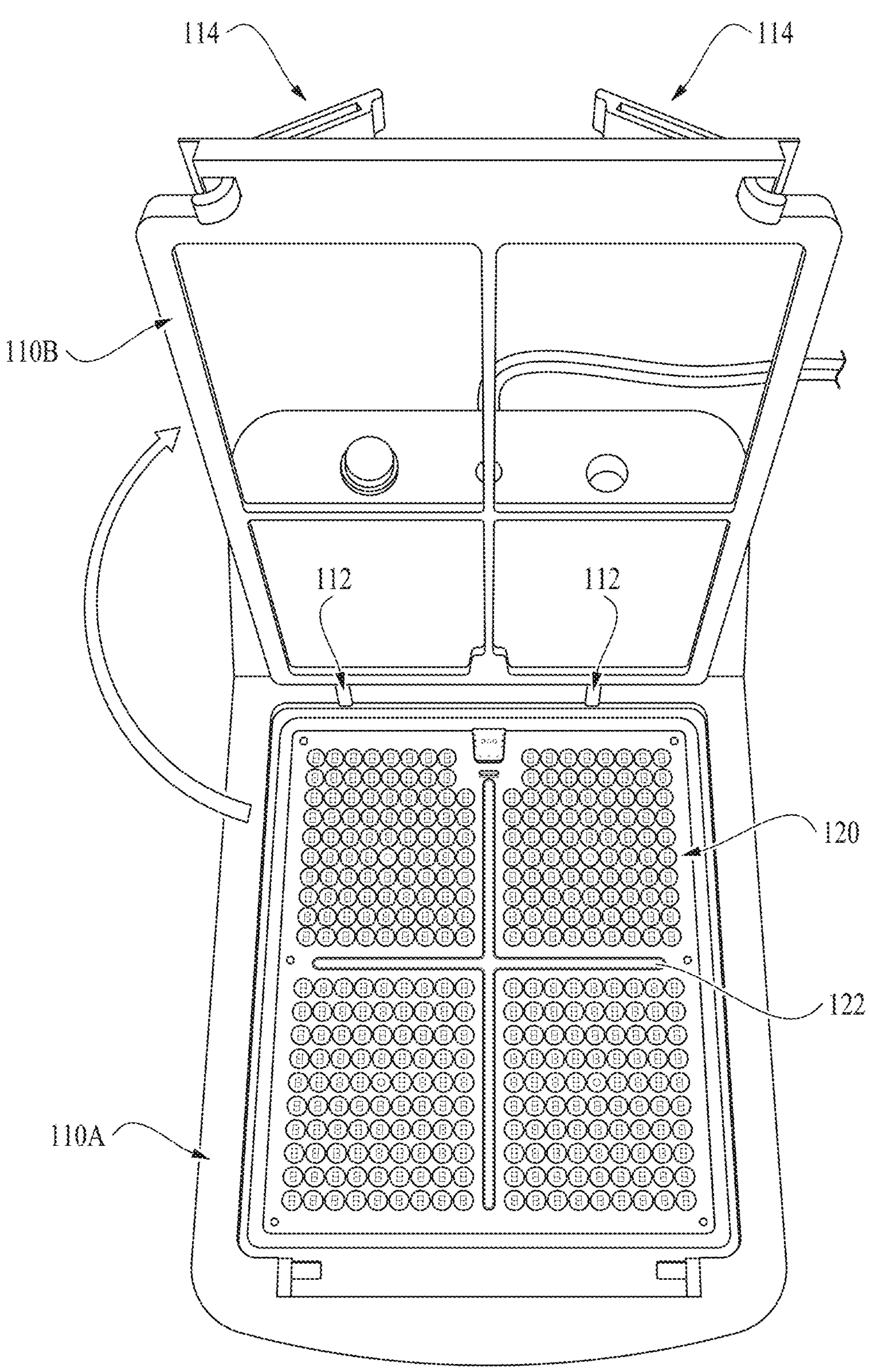
Figure 2C:
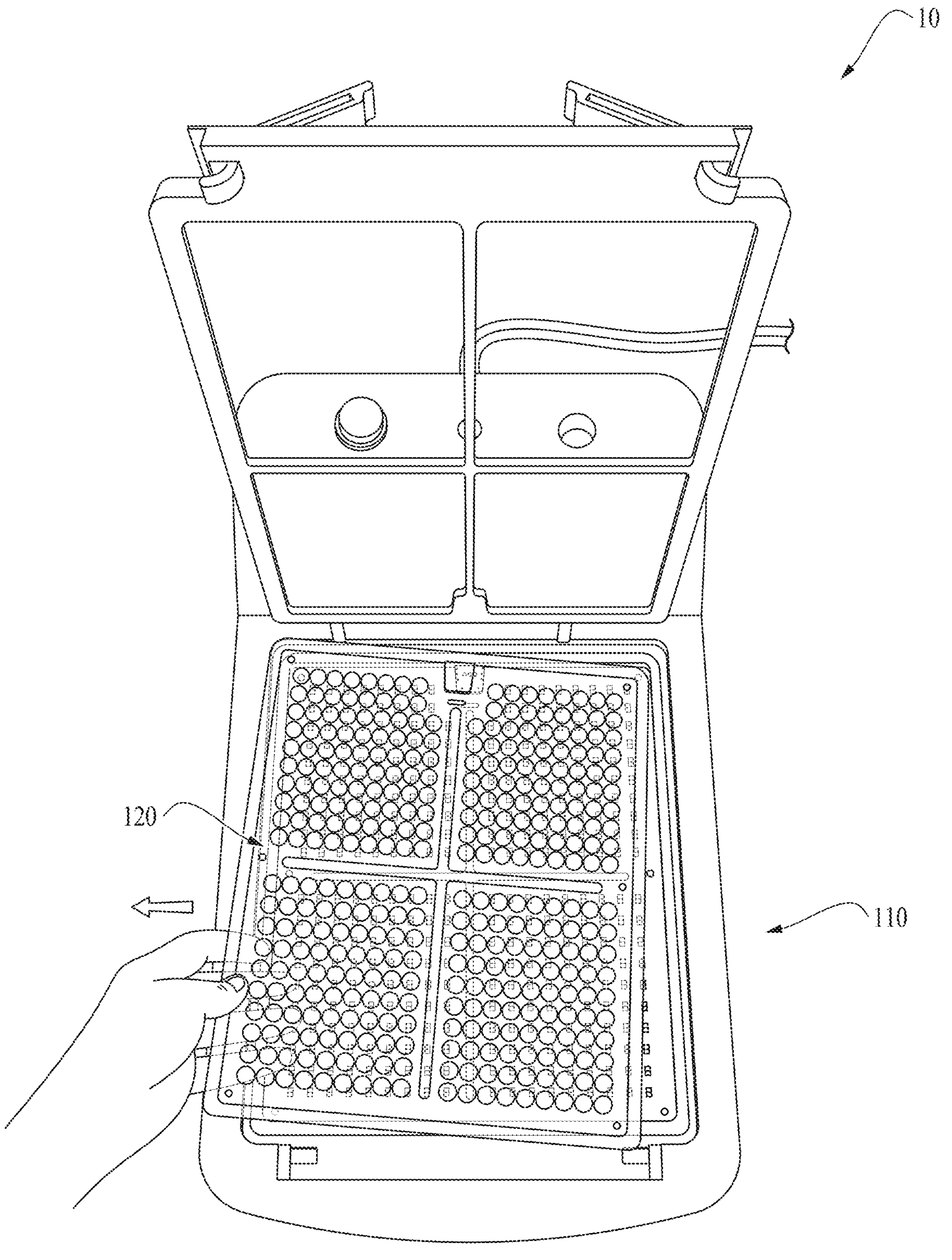

In example embodiments, and with particular reference to FIG. 2B, the housing 110 may have a clamshell configuration, with a main body portion 110A and a hingedly or pivotally connected cover portion 110B. Optionally, the housing includes one or more hinged couplings 112 between the main body portion 110A and the cover portion 110B, and one or more latches 114 movable between a closed or engaged configuration retaining the housing closed and an open or disengaged configuration allowing the cover portion 110B to be opened relative to the main body portion 110A for access to internal components. The housing 110, for example the cover portion 110B, may comprise one or more passages, openings or light-transmissive portions to allow light emitted from internal light sources such as LEDs to pass through the housing to illuminate the area outside the housing. For example, in the depicted embodiment the cover portion 110B of the housing includes four rectangular openings divided by a cross-shaped lattice, aligned with the light-emitting areas of the LED board 130, and configured to receive cooperating sections of the lens cover or optics 120.

In example embodiments, the lens cover or optics 120 and the LED board 130 are removable from and replaceable within the housing 110. FIGS. 2A, 2B, 2C, 2D, 2E and 2F show a method or sequence of removal of components for replacement, as by a repair technician in the field to replace a damaged LED board. As shown in FIG. 2B, the latches 114 are disengaged, and the cover portion 110B of the housing pivoted to its open configuration, allowing the technician to access internal components within the main body portion 110A of the housing 110. Preferably, power to the luminaire 10 is turned off or disconnected for safety during the process.

As shown in FIG. 20, the lens cover or optics 120 may then be removed by disengagement from the housing to expose the underlying LED board 130. In example embodiments, the lens cover or optics 120 comprises a generally rectangular or otherwise shaped panel configured to fit within or on and generally conform to the shape of the light-emitting opening portion(s) of the housing 110. At least a portion of the lens cover or optics 120 is generally transparent or light-transmissive, and optionally includes one or more lenticular light-directing or focusing elements, and in further example embodiments a plurality of lenticular elements arranged in an array or matrix. The lens cover 120 and the LED board 130 are preferably aligned and generally in parallel planes when installed in the housing, optionally with the lenticular elements of the lens cover positioned in alignment with corresponding LED light sources. In example embodiments, the lens cover or optics is formed of a polycarbonate or other polymeric material, glass, or other materials of construction. In some example embodiments, the lens or optics 120 may be aligned and retained in position by a plurality of pins 124 extending from the back surface of the lens, which pass through holes in the LED board 130 and engage within receiver openings in the base of the housing 110, as detailed below. Alternatively, one or more screws, bolts, fasteners or other alignment and attachment means may be provided. The lens cover 120 may optionally also comprise one or more recesses, channels, slots, projections, or other alignment features to assist in proper positioning of the lens cover within the housing. For example, in the depicted embodiment, the lens 120 optionally includes one or more positioning channels, such as the cross-shaped features 122 formed between protrusions in the back of the lens that cooperatively engage corresponding cross-shaped alignment features of the housing and/or LED board. In alternate embodiments, the lens or optic may be otherwise configured, with or without the alignment features, and/or may be attached to the housing using various attachment means, such as screws, bolts, snaps, or other couplings. In further alternate embodiments, the lens or optic may be integrally formed with the replaceable LED board or may be otherwise attachable to the LED board.

Figure 2D:
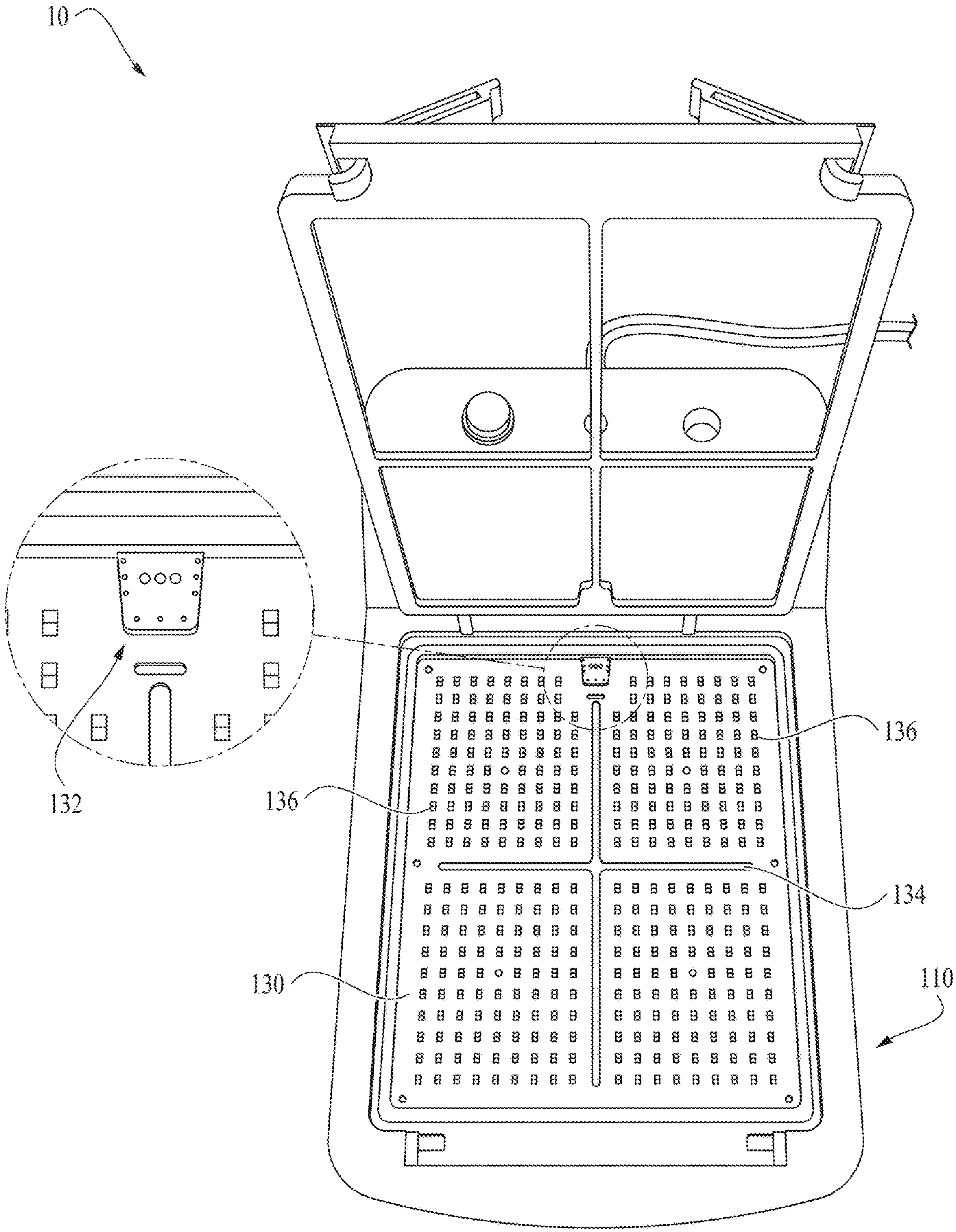
Figure 2E:
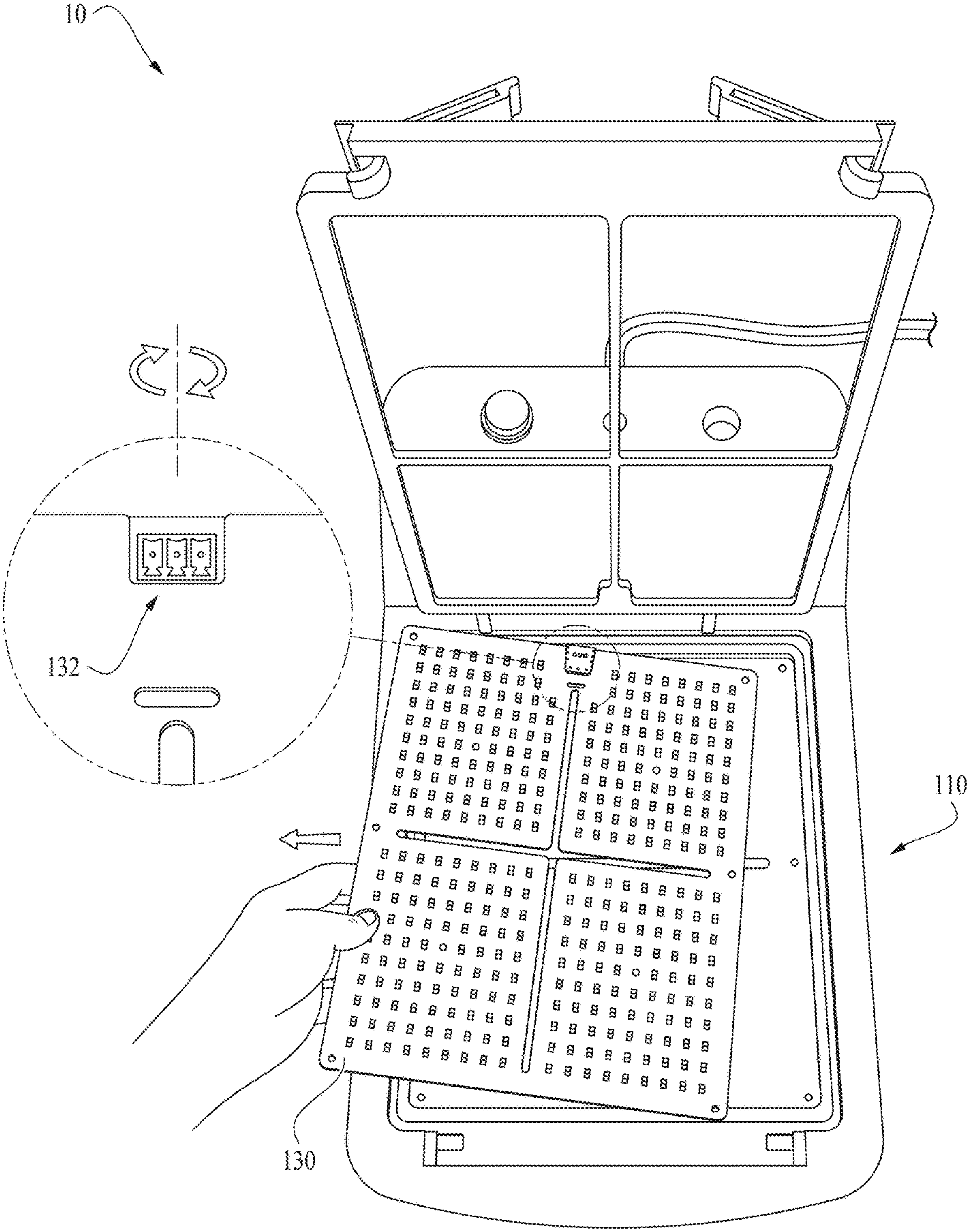
Figure 2F:
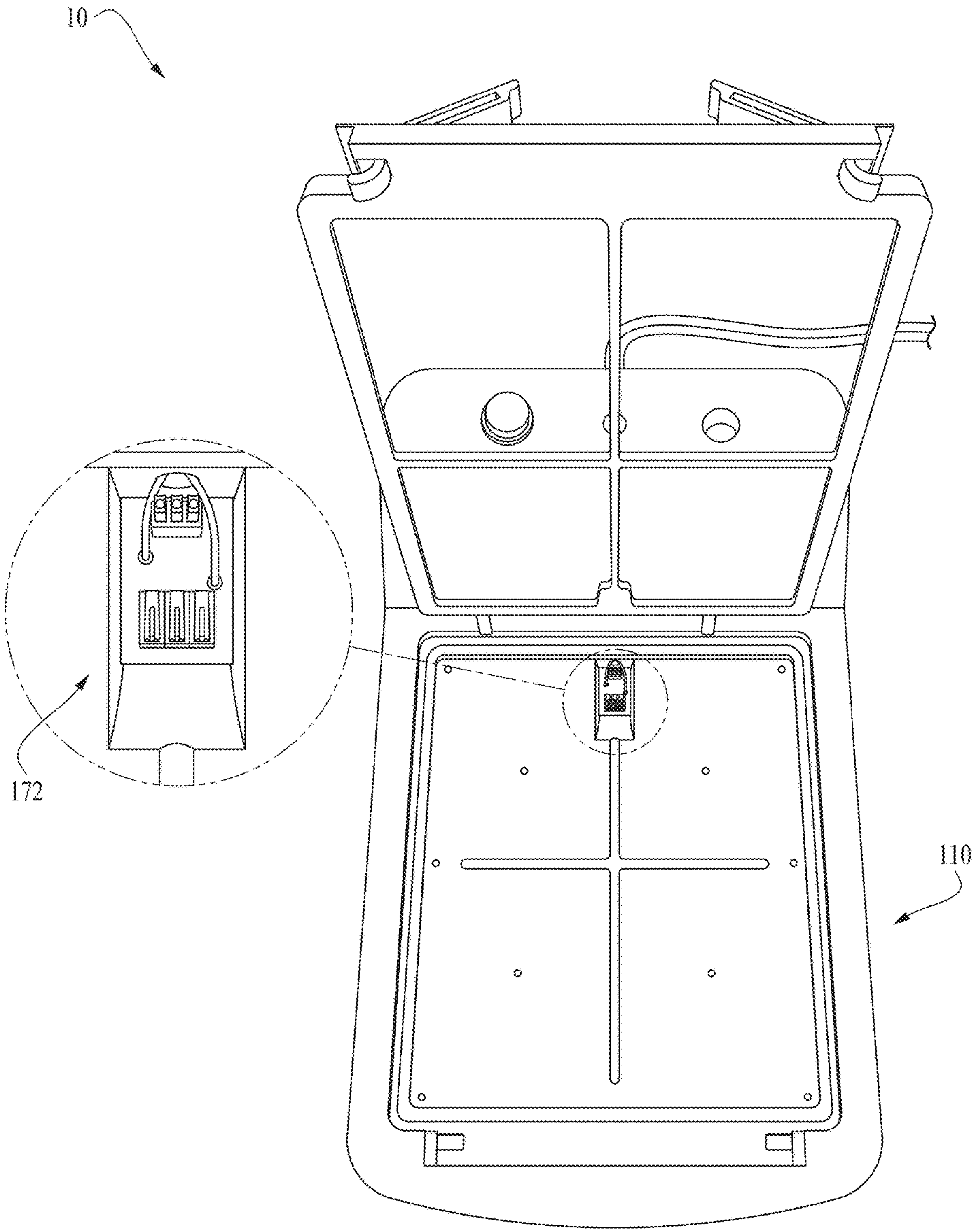

With reference to FIGS. 2D and 2E, the LED board 130 may then be removed from the housing for replacement. In example embodiments, the LED board 130 comprises a generally rectangular or otherwise shaped panel configured to fit within or on and generally conform to the shape of the light-emitting portion of the housing 110. In example embodiments, the panel of the LED board 130 comprises fiberglass, plastic, polymeric, or other material(s) of construction having a structural rigidity to provide support for the LEDs and other electronics mounted thereon. In example embodiments, the LED board 130 includes a quick-release electrical coupling 132 configured for engagement and disengagement with a cooperative electrical coupling 172 mounted to the housing. The LED board 130 optionally further includes one or more alignment and retention features, such as for example cross-shaped slots 134 and one or more alignment holes 136, as described in further detail below. In example embodiments, the cross-shaped slot configuration includes a first slot portion and a second slot portion, wherein the first and second slot portions are arranged transverse to one another at about a 90° angle. The LED board 130 further comprises one or more, and preferably a plurality of LED (light emitting diode) light sources 136 mounted in, on, or integrally formed therewith. In particular embodiments, the LED board 130 comprises a plurality of LED light sources 136 arranged in an array or matrix. FIG. 2F shows the luminaire 10 with the LED board 130 removed from the housing 110.

Figure 3A:
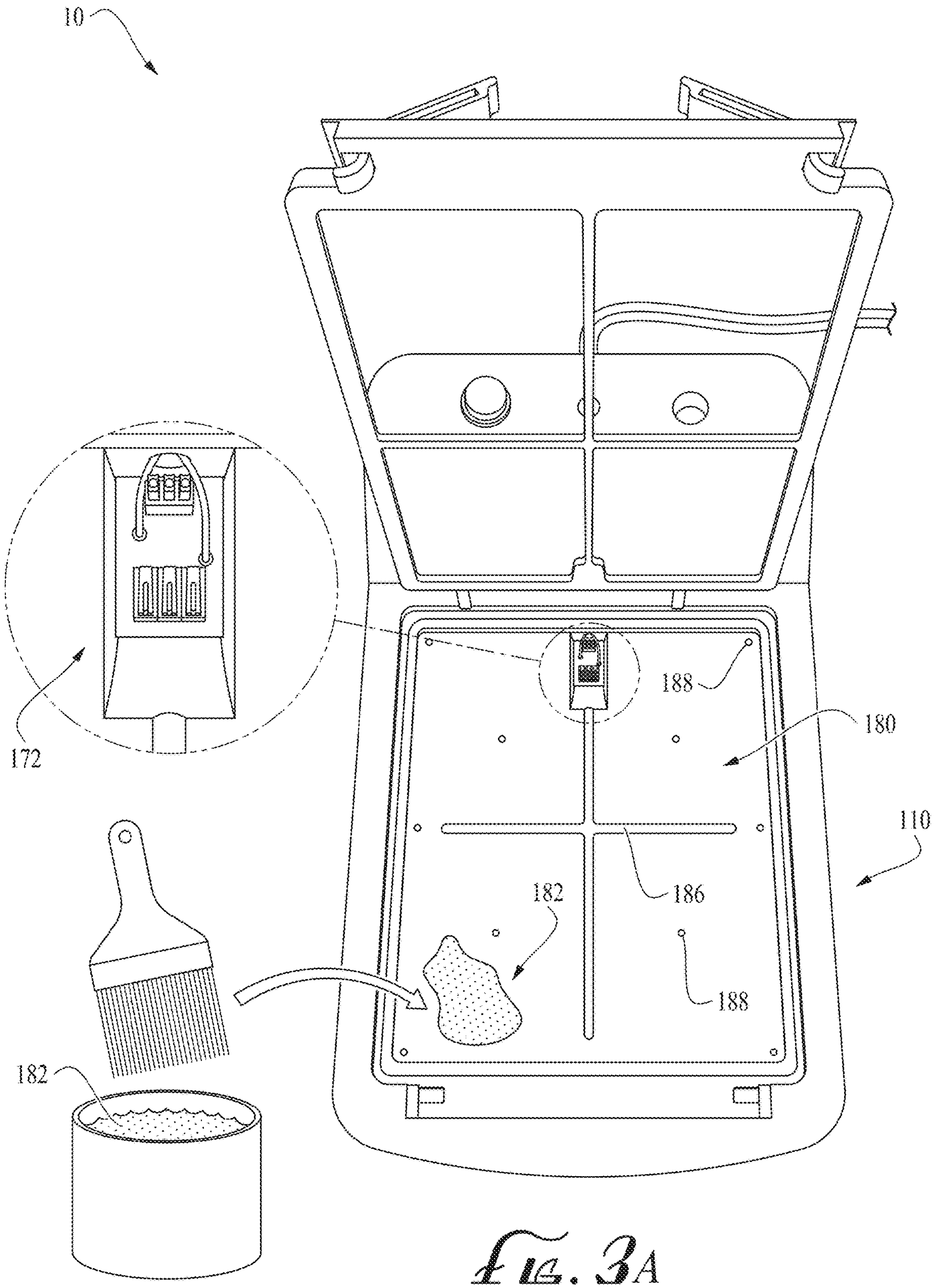
FIGS. 3A-3F (collectively referred to herein as FIG. 3) show a sequence of installation of a replacement LED board into a luminaire or lighting fixture according to an example embodiment of the present invention.

FIGS. 3A, 3B, 3C, 3D, 3E and 3F show a method or sequence of installation of a replacement LED board 130' and/or lens 120' into the housing 110 of the luminaire 10, as by a repair technician in the field where the luminaire is mounted or installed and used. As shown in FIG. 3A, the housing 110 is opened to expose an interior surface 180 to which the replacement LED board 130' is mounted. The interior surface 180 preferably has a high thermally conductivity, for example formed of aluminum, steel or other metal, and configured to act as a heat sink for heat generated by the LED board 130' and dissipate the heat to the ambient exterior of the housing 110. Optionally, a thermal paste or compound 182 is applied to the interior surface 180 and/or to the back side of the LED board 130' to provide improved thermal conductivity and heat removal. Alternatively, the replacement LED board 130' may be provided with the thermal paste or compound 182 pre-applied to its back surface. The thermal paste 182 may be applied evenly across the surface(s), or spot-applied to the contact points of the LEDs 136 and the surface 180. The application of thermal paste may be done using various mechanisms, such as for example providing a packet or other container or applicator of thermal paste with the replacement LED board, and optionally including instructions and/or markings on the back of the LED board for proper placement and application of the thermal paste. Alternatively, the thermal paste may be pre-applied to the replacement LED board, with a peel-off cover sheet that is removed by the technician during installation. The interior surface 180 optionally comprises one or more alignment and retention features, such as for example cross-shaped fins, flanges or recesses 186 and one or more alignment and engagement receiver holes or openings 188.

Figure 3B:
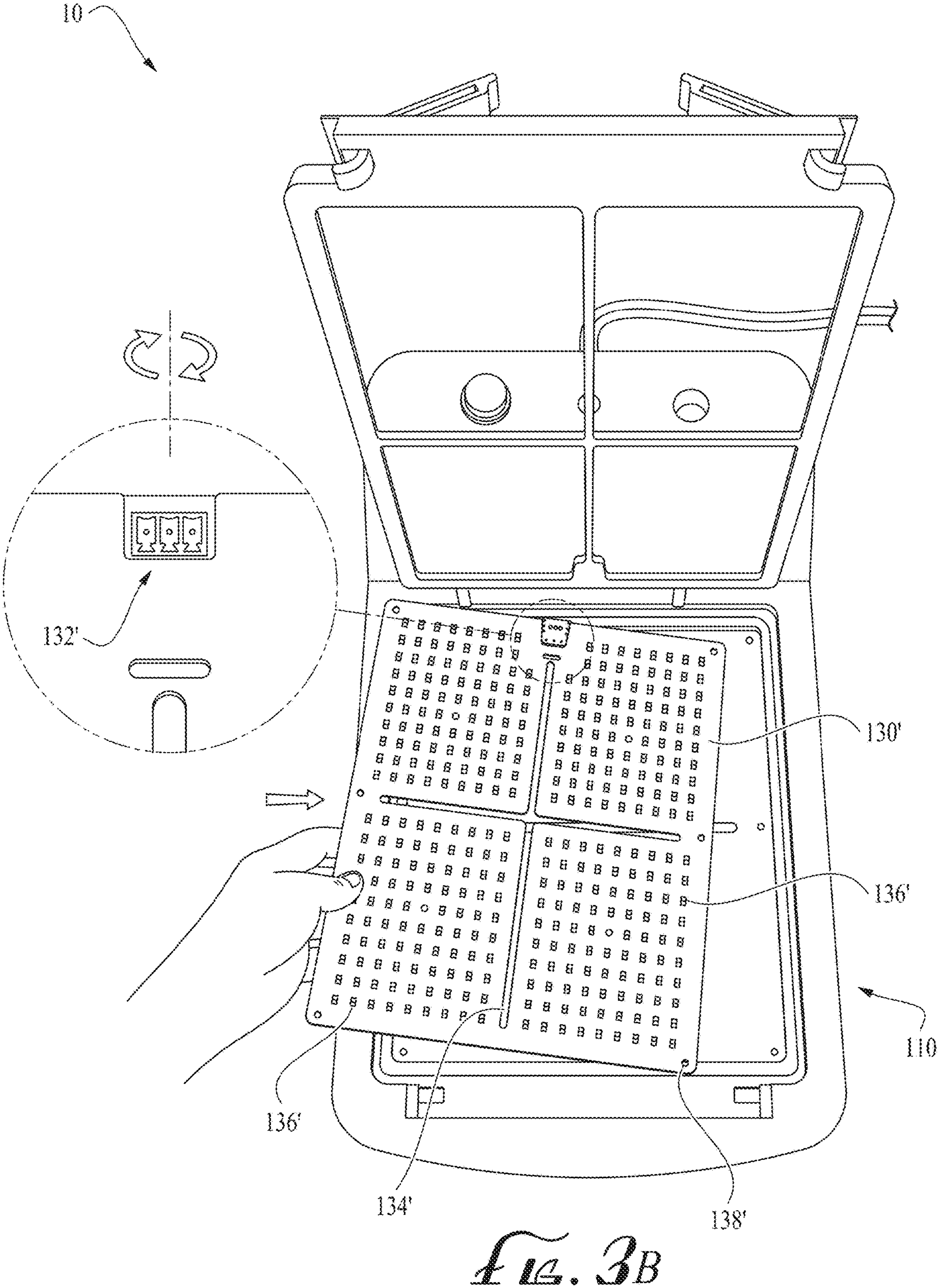

As shown in FIG. 3B, the replacement LED board 130' is installed by placement into the housing 110 and connecting the quick-connect electrical coupling element 132' with the electrical coupling of the housing 172. The replacement LED board 130' is preferably configured to be generally identical in shape and size to the replaced LED board 130, or at least compatible with the housing and its electrical couplings, and alignment and retention features. Optionally, the replacement LED board 130' can be provided with the same or different LED light source configurations (i.e., brightness, color/Kelvin temperature) as the replaced board, for example including at least one, and preferably a plurality of LED light sources 136' mounted in, on, or integrally formed therewith. If provided, alignment and engagement features such as the cross-shaped slots 134' and one or more alignment holes 138' of the replacement LED board 130' are aligned with the corresponding alignment and retention features 186, 188 of the housing, to ensure proper positioning of the LED board 130' within the housing and in relation to associated components and couplings.

Figure 3C:
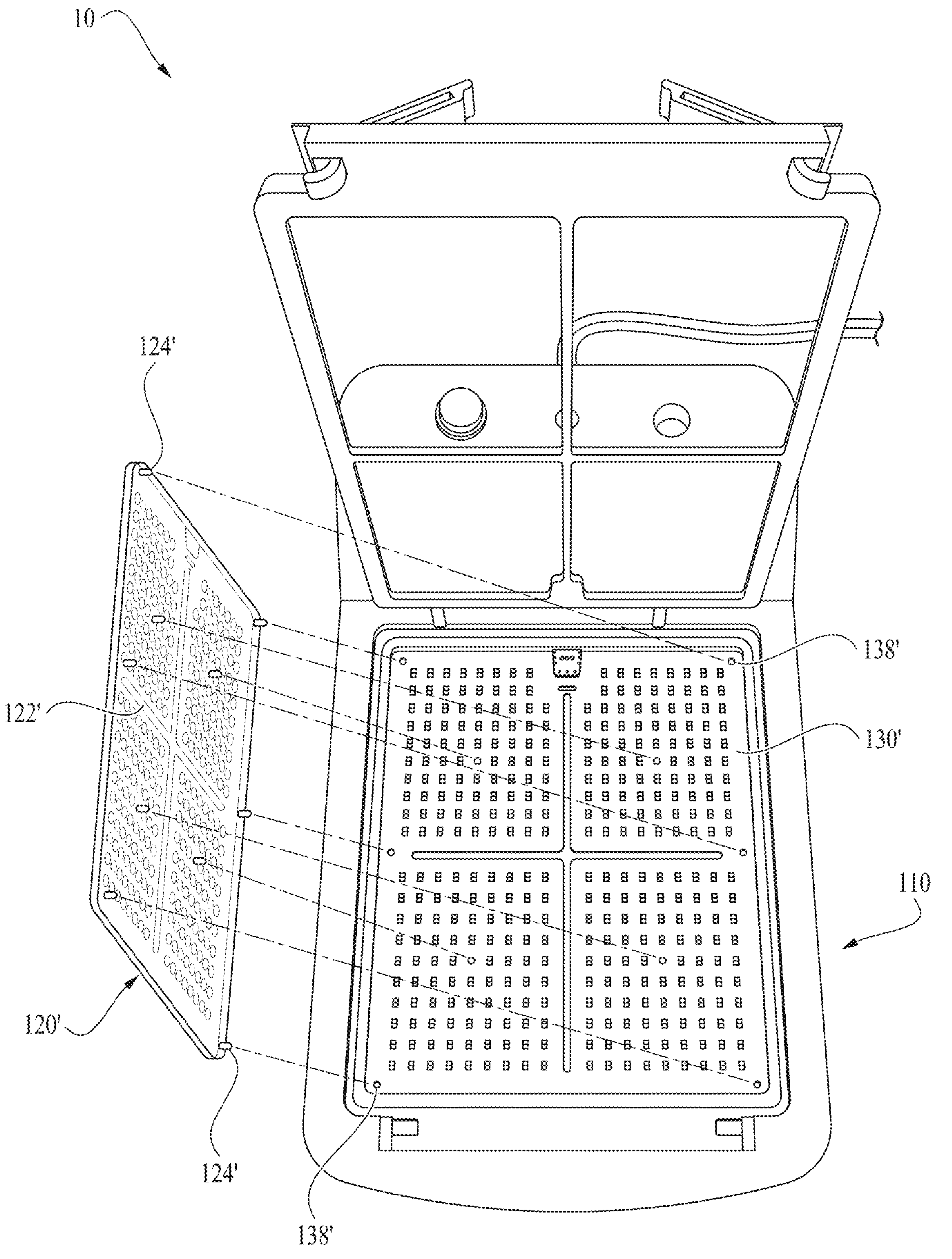
Figure 3D:
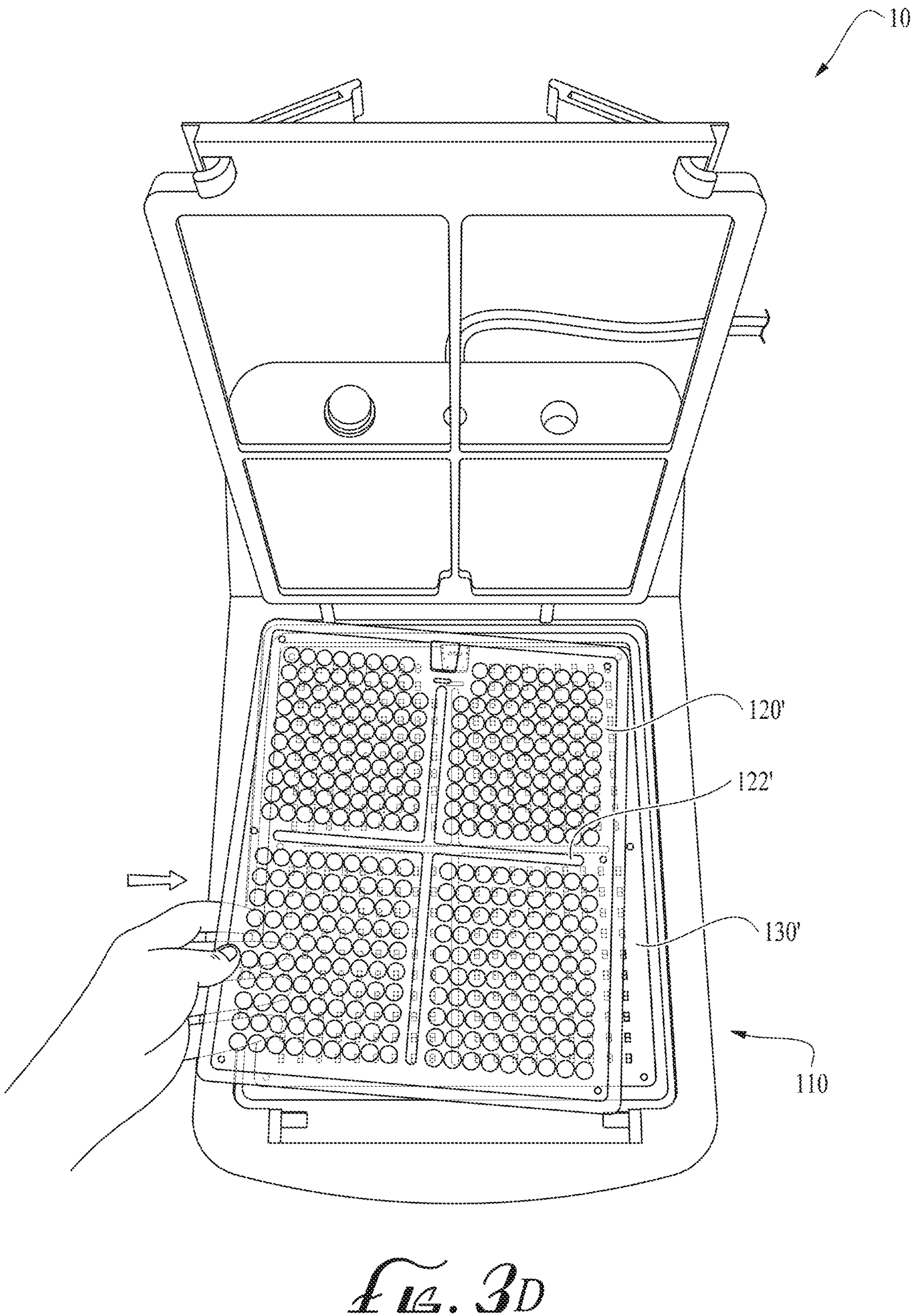

The lens cover or optics 120, or a replacement lens cover or optics 120', is then installed, as shown in FIGS. 3C and 3D. If provided, the alignment and engagement features are engaged for proper positioning. For example, in the depicted example, the cross-shaped projections or recesses 122' of the lens 120' are engaged through the cross-shaped slots 134' of the LED board and into engagement with the cooperating cross-shaped fins, flanges or recesses 186 of the housing 110; and/or one or more (preferably a plurality of) pins or projections 124' extending from the back surface of the lens are installed through the corresponding holes 138' and into engagement with the corresponding receiver holes or openings 188 in the housing body.

Figure 3E:
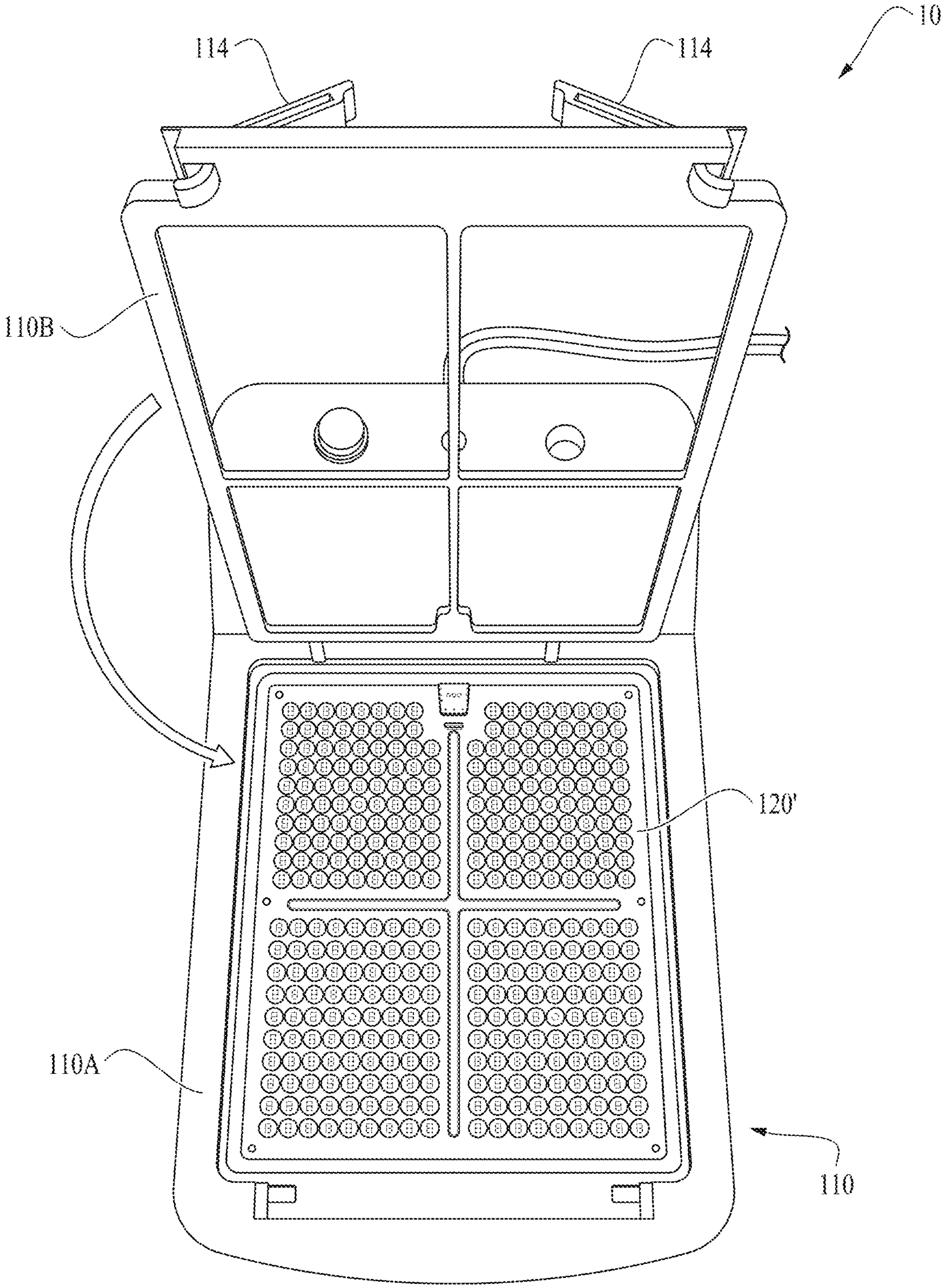
Figure 3F:
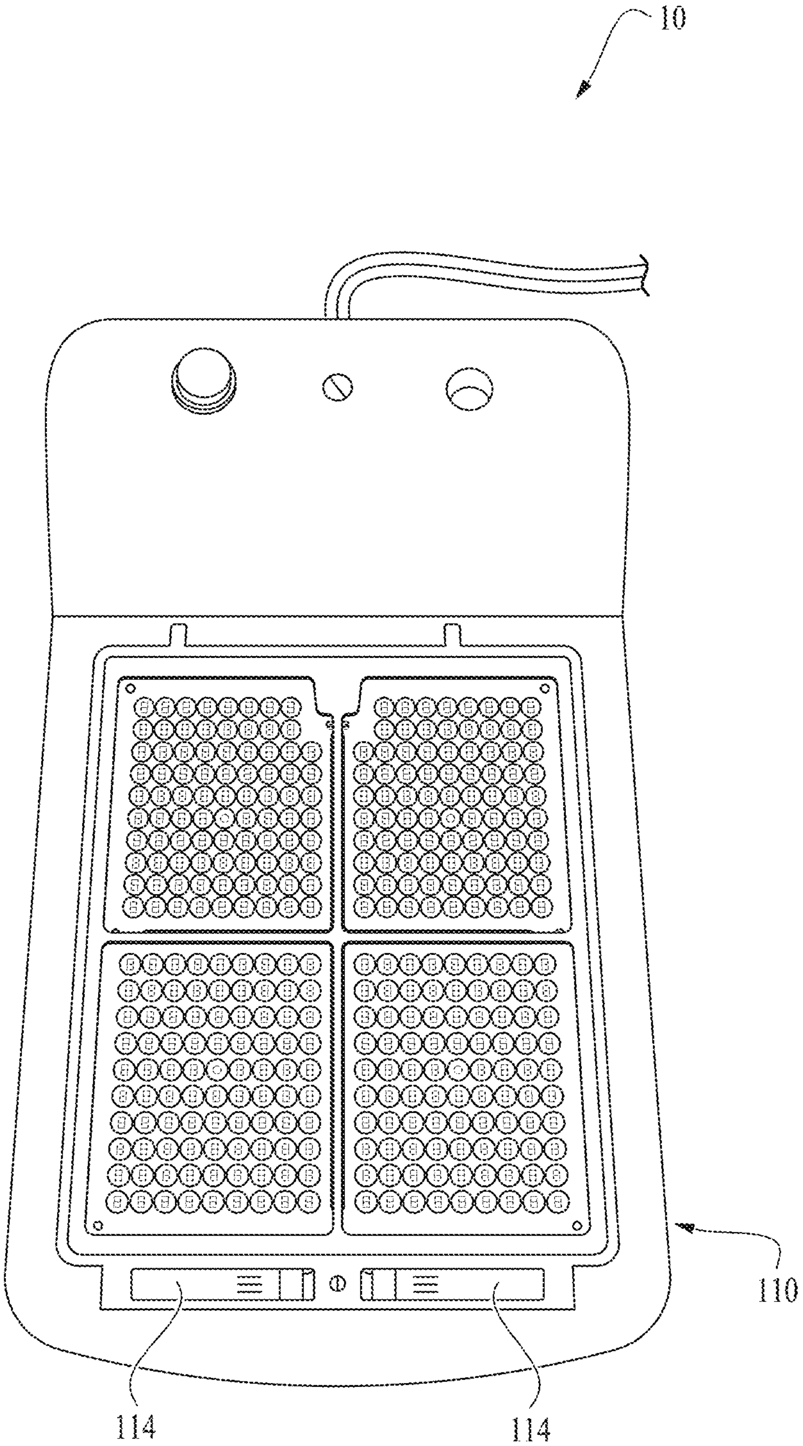

The housing 110 is then closed, as shown in FIGS. 3E and 3F, pivoting the cover portion 110B closed onto the main body portion 110A. The latches 114 are then engaged to secure the housing 110 closed, with the interior components retained in place. The power may then be turned back on and the luminaire 10 operated in typical fashion.

Figure 4A:
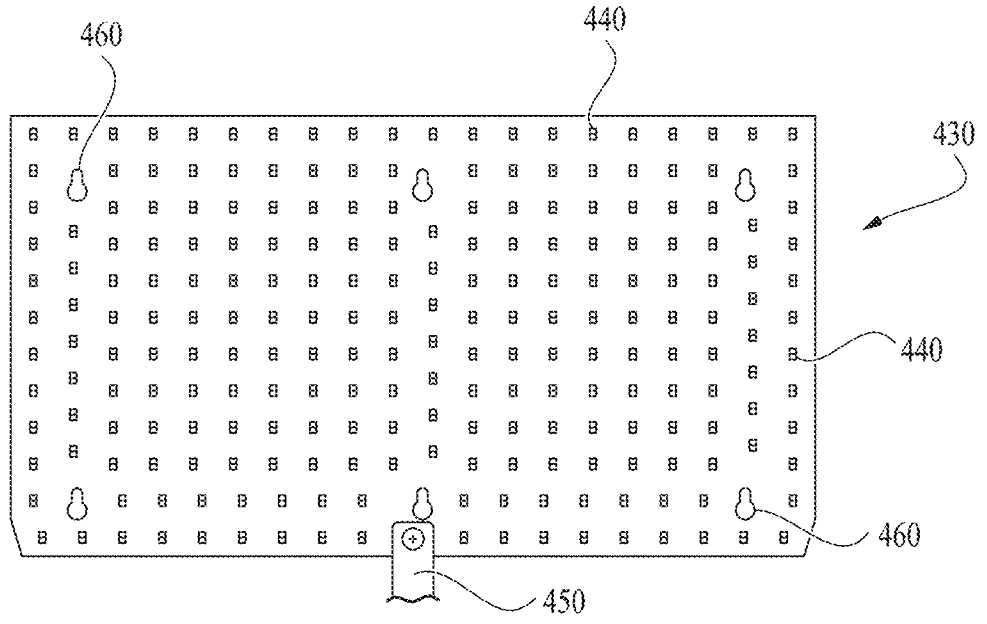
FIGS. 4A and 4B show a replaceable LED board and a portion of the housing of a luminaire or lighting fixture to which the LED board is mounted, according to another example embodiment of the invention.
Figure 4B:
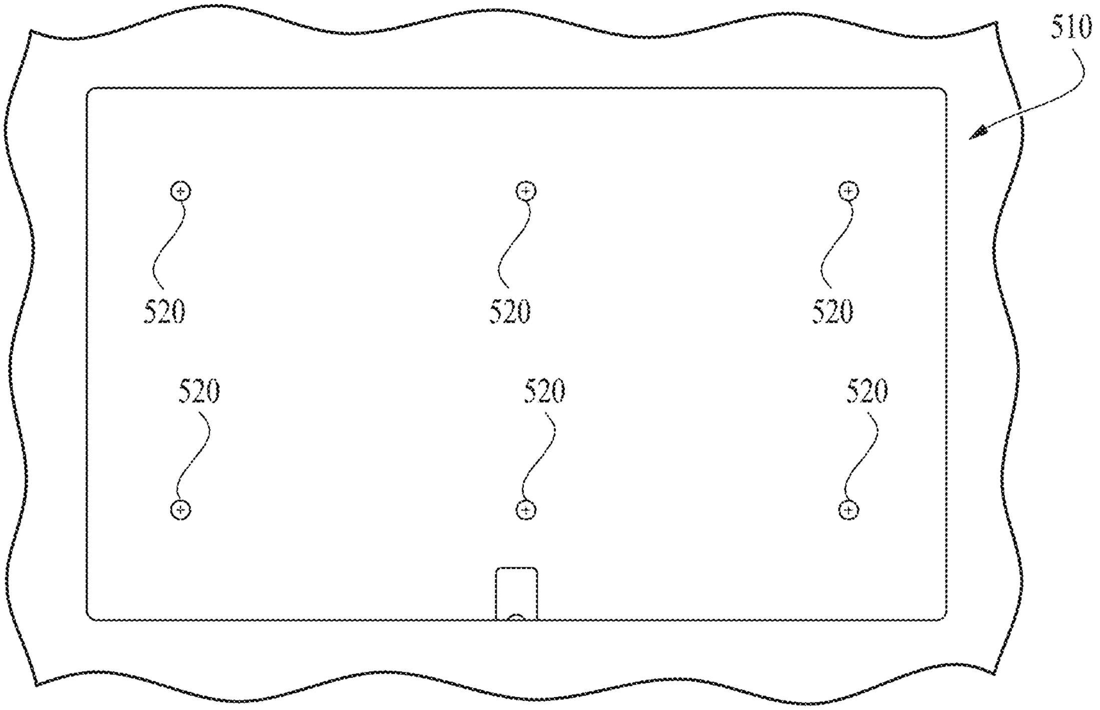
Figures 5A, 5B, 5C, 5D, 5E, 5F:
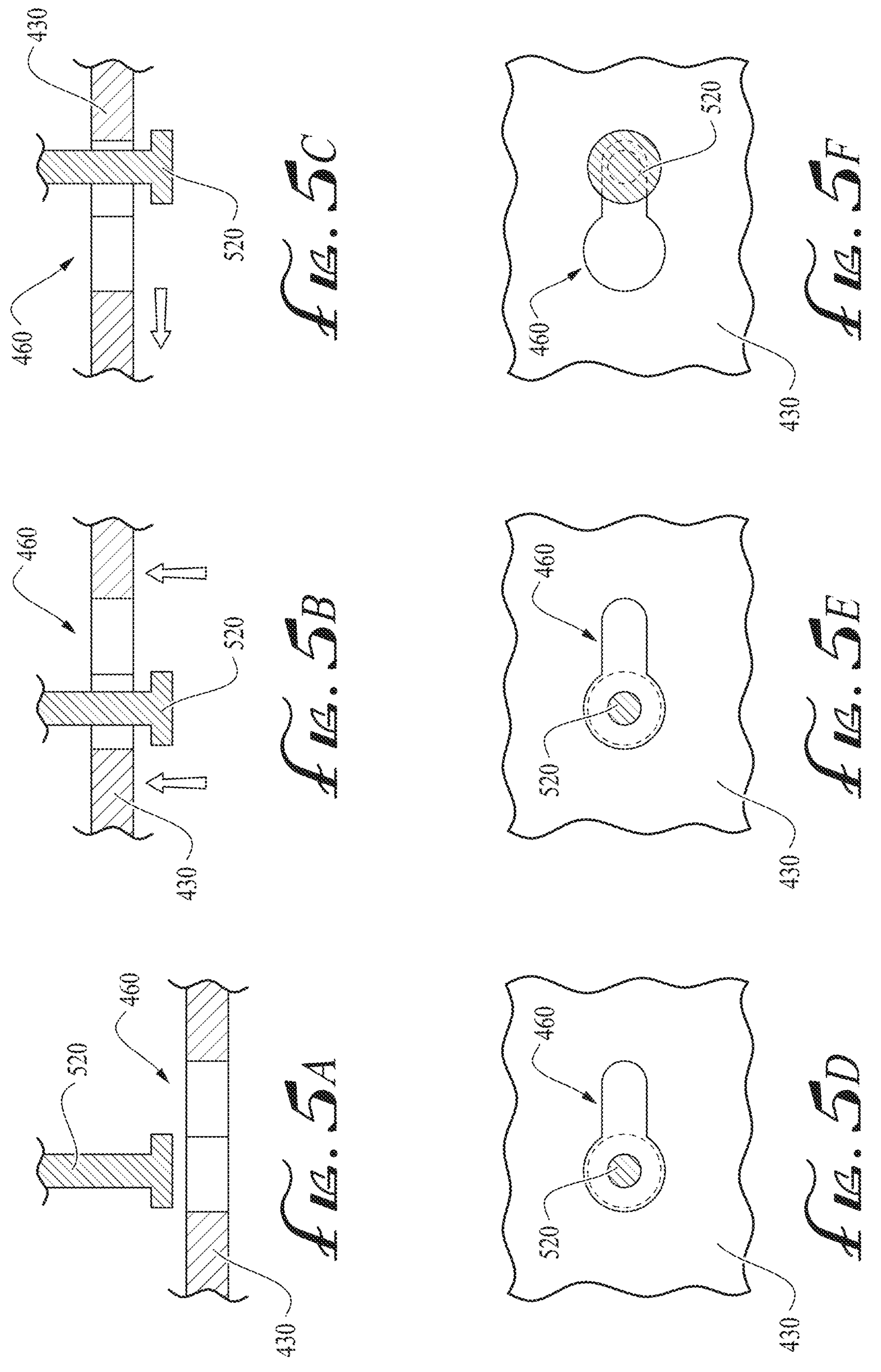
FIGS. 5A-5F show details of interengaging attachment portions of the LED board and housing of FIGS. 4A and 4B, according to an example process of replacement of an LED board in a luminaire or lighting fixture according to another example embodiment of the invention.

FIGS. 4A-4B show another example embodiment of a replaceable LED board 430 and a corresponding housing portion 510, and FIGS. 5A-5F show further details of alignment and engagement features for positioning and securing the LED board onto the housing. The housing 510 may have one or more attachment elements for attaching the LED board 430 to the housing. In the example embodiment shown, the attachment elements comprise screws 520 extending normally from a mounting surface of the housing 510. The screws 520 may move along their axis into and out of the housing when twisted. In other embodiments, the attachment elements may be bolts, snaps, or another suitable attachment means. The housing may further comprise a sealing arrangement comprising one or more gaskets, O-rings or other seals, and/or a blister cover or waterproof connector that fits over the electrical connector to ensure a watertight electrical connection and sealed housing arrangement.

In example embodiments, the LED board 430 further comprises one or more LEDs 440, one or more electrical connectors 450, and one or more attachment elements configured for attachment to the attachment elements of the housing. In the embodiment shown, the attachment elements are the keyhole or keyway slots 460. In other embodiments, the complementary attachment means may be another suitable attachment means that is otherwise complementary to the attachment elements of the housing. As best seen in FIGS. 5A-5F, the LED board 430 is mounted to the housing 510 by aligning the heads of the screws 520 with the wide section of the keyhole slots 460. The LED board is then axially moved and positioned such that the heads of the screws 520 of the housing extend through the wide section of the keyhole slots. The LED board 430 is then moved sideways such that the screws 520 are generally within the thinner section of the keyhole slots 460. The heads of the screws 520 are sized such that their diameter is smaller than the wide section of the keyhole slots but larger than the thinner section of the keyhole slots. Thus, the screws 520 may pass through the wide section of the keyhole slots, but not through the thinner sections. Once the board is in the appropriate position, the screws 520 may be twisted to tighten such that the screws 520 move into the housing, thereby fixing the LED board 430 to the housing 510.

The LED board 430 is electronically connected to the power driver by inserting the electrical connector 450 comprising the power terminals into the receiver of the housing's electrical coupling. The connection puts the power driver into electronic communication with the LEDs. Once the LED board is mounted to the housing, the optic or lens may optionally be removably attached to the housing using screws, or another suitable attachment means, such that the optic overlies (or underlies) the LED board.

To remove the LED board 430 from the housing 510, the optic is removed if connected to the housing, and the screws 520 are loosened. The LED board is then disconnected from the power driver by pushing the LED board back and away from the receiver of the housing, thereby removing the connector 450 of the LED board from the receiver. Pushing the LED board 430 back also positions the LED board such that the screws 520 of the housing are generally within the wide section of the keyhole slots 460. The LED board is then moved away from the housing in a direction normal to the face of the housing. In other embodiments, where different attachment elements are used, different steps to attach and detach the LED board from the housing may be needed.

In alternate embodiments, the housing, may comprise one, two or more receivers configured to connect with a corresponding number of replaceable LED board(s). In further alternate embodiments, the board may be connected to the housing using quarter turn screws. Such an embodiment may require less relative movement between the board 213C and the housing. In some further example embodiments, when the LED board is removed, the attachment means of the housing remain captive in place. This allows the user or technician to focus on replacing the board, rather than managing or chasing other components and small parts such as screws. This may be especially advantageous when the user or technician is replacing the board while on a lift or a ladder, or in tight spaces or difficult to reach locations.

In further example embodiments, the design of the LED board allows the replacement board to be mounted without significant disruption to the thermal paste between the LED board and the housing mounting surface. In some embodiments, the thermal paste is applied to the LED board by the manufacturer. In such embodiments, a protective cover or wrap may be placed over the thermal paste until the board is ready for connection with a luminaire. In other embodiments, the thermal paste is applied to the LED board by a user or technician during installation. In such embodiments, the user may follow a pattern or instructions supplied by a manufacturer.

While the invention has been described with reference to example embodiments, it will be understood by those skilled in the art that a variety of modifications, additions and deletions are within the scope of the invention, as defined by the following claims.

What is claimed is:

1. A replaceable light-emitting diode (LED) board for a luminaire, the LED board comprising:

a panel configured for removable within a housing of the luminaire;

a plurality of light emitting-diode light sources on the panel;

a releasable electrical coupling for connection with a cooperative coupling of the housing, to deliver electrical power to illuminate the light emitting-diode light sources; and at least one alignment feature for maintaining consistent positioning of the panel within the housing when the LED board is removed from and replaced in the housing;

wherein the at least one alignment feature comprises at least one opening through the panel, configured for positional alignment with at least one corresponding alignment element of the housing;

wherein the at least one opening through the panel comprises at least one slot in the panel; and wherein the at least one slot in the panel comprises a cross-shaped slot arrangement comprising a first slot portion and a second slot portion, wherein the first and second slot portions are arranged transverse to one another.

2. The replaceable LED board of claim 1, wherein the at least one opening through the panel comprises a plurality of holes through the panel.

3. The replaceable LED board of claim 1, wherein the at least one alignment feature comprises at least one keyhole-shaped opening configured for engagement with a fastener, the at least one keyhole-shaped opening having a first portion defining a larger crosswise dimension larger than a corresponding dimension of an engagement portion of the fastener, and a second portion defining a smaller crosswise dimension smaller than a corresponding dimension of the engagement portion of the fastener.

4. The replaceable LED board of claim 3, wherein the fastener is a screw, and the engagement portion of the fastener is a head of the screw.

5. The replaceable LED board of claim 1, further comprising a thermal paste compound applied to at least a portion of a back surface thereof.

6. A luminaire having a replaceable light emitting diode (LED) board, the luminaire comprising:

a housing having at least one passage for allowing light to pass therethrough, a first detachable electrical coupling portion, and at least one housing alignment feature; and an LED board comprising a panel configured for removable engagement within the housing, a plurality of light emitting-diode light sources positioned on the panel, a second detachable electrical coupling portion for detachable and re-attachable connection with the first detachable electrical coupling portion of the housing to deliver electrical power to Illuminate the light emitting diode light sources and at least one LED board alignment feature for cooperative alignment with the at least one housing alignment feature to maintain a consistent positioning of the panel within the housing;

wherein the LED board is removable from the housing and replaceable into the housing by alignment of the at least one LED board alignment feature with the at least one housing alignment feature and connection of the first and second detachable electrical coupling portions;

where the at least one LED board alignment feature comprises at least one opening through the panel;

wherein the at least one opening through the panel comprises at least one slot in the panel; and wherein the at least one slot in the panel comprises a cross-shaped slot arrangement comprising a first slot portion and a second slot portion, wherein the first and second slot portions are arranged transverse to one another.

7. The luminaire of claim 6, wherein the at least one opening through the panel comprises a plurality of holes through the panel.

8. The luminaire of claim 6, further comprising a lens cover configured for removable engagement within the at least one passage of the housing and over the LED board.

9. The luminaire of claim 8, wherein the lens cover comprises a plurality of lenticular elements, each configured for alignment over a corresponding one of the plurality of light emitting-diode light sources when the lens cover is engaged with the housing.

10. The luminaire of claim 8, wherein:

the lens cover comprises a plurality of projections extending from a back surface thereof, the at least one LED board alignment feature comprises a plurality of holes through the panel, and the at least one housing alignment feature comprises a plurality of receivers in the housing, and wherein each of the plurality of projections on the lens cover is configured to extend through a corresponding one of the plurality of holes through the panel and into a corresponding one of the plurality of receivers in the housing.

11. The luminaire of claim 8, wherein the at least one passage of the housing comprises a cross-shaped lattice defining a plurality of light passages, and wherein the lens cover comprises cross-shaped lens cover alignment features for cooperative engagement with the cross-shaped lattice of the housing.

12. The luminaire of claim 11, wherein the at least one LED board alignment feature comprises cross-shaped slots configured for alignment with the cross-shaped lens cover alignment features.

13. The luminaire of claim 6, wherein the housing comprises a main body portion and a cover portion hingedly coupled to the main body portion.

14. The luminaire of claim 6, further comprising a thermal paste compound applied to at least one of a back face of the LED board and a thermally conductive surface of the housing.

15. A method of replacement of a first LED board with a second LED board within a luminaire, the method comprising:

disengaging a detachable electrical coupling between the first LED board and a housing of the luminaire;

removing the first LED board from a specific position within the housing of the luminaire;

installing the second LED board into the housing of the luminaire by aligning at least one LED board alignment feature of the LED board with at least one corresponding housing alignment feature of the housing to align the second LED board in the same specific position within the housing;

engaging the detachable electrical coupling between the second LED board and the housing of the luminaire; and installing a lens cover into the housing in alignment with the second LED board;

wherein the lens cover comprises at least one projection extending from a back surface thereof, and wherein the step of aligning at least one LED board alignment feature of the LED board with at least one corresponding housing alignment feature of the housing comprises insertion of the at least one projection of the lens cover through the at least one LED board alignment feature and into engagement with the at least one housing alignment feature.

16. The method of claim 15, further comprising application of a thermal paste compound to at least one of a back face of the LED board and a thermally conductive surface of the housing.

* * * * *